(12) United States Patent
Chowdhary et al.

(10) Patent No.: US 9,042,356 B2
(45) Date of Patent: May 26, 2015

(54) METHOD AND APPARATUS FOR CONFIRMING DELIVERY OF GROUP DATA TO RADIO COMMUNICATION DEVICES IN A WIRELESS COMMUNICATION SYSTEM

(75) Inventors: Dipendra M. Chowdhary, Hoffman Estates, IL (US); Thomas B. Bohn, McHenry, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 142 days.

(21) Appl. No.: 13/485,125

(22) Filed: May 31, 2012

(65) Prior Publication Data

US 2013/0322414 A1  Dec. 5, 2013

(51) Int. Cl.
*H04W 4/00* (2009.01)
*H04W 4/08* (2009.01)
*H04L 12/58* (2006.01)

(52) U.S. Cl.
CPC ............. *H04W 4/08* (2013.01); *H04L 51/30* (2013.01); *H04L 51/38* (2013.01)

(58) Field of Classification Search
USPC ............. 370/312, 328–339, 346, 350, 449, 370/473–474; 714/748–751
See application file for complete search history.

(56) References Cited

U.S. PATENT DOCUMENTS

| | | | |
|---|---|---|---|
| 4,924,462 A | 5/1990 | Sojka | |
| 5,032,835 A | 7/1991 | DeLuca | |
| 5,327,578 A | 7/1994 | Breeden et al. | |
| 5,365,512 A | 11/1994 | Combs et al. | |
| 5,373,548 A | 12/1994 | McCarthy | |
| 5,677,909 A | 10/1997 | Heide | |
| 5,867,782 A | 2/1999 | Yoon | |
| 5,995,500 A | 11/1999 | Ma et al. | |
| 6,097,707 A | 8/2000 | Hodzic et al. | |
| 6,128,483 A * | 10/2000 | Doiron et al. | ............... 455/419 |

(Continued)

FOREIGN PATENT DOCUMENTS

EP    1770903 A1    4/2007

OTHER PUBLICATIONS

Speakman, T., "PGM Reliable Transport Protocol Specification," Network Working Group, RFC 3208, Dec. 2001.

(Continued)

*Primary Examiner* — Frank Duong
(74) *Attorney, Agent, or Firm* — Barbara R. Doutre

(57) ABSTRACT

A method and apparatus for confirming delivery of group data to a plurality of radio communication devices in a wireless communication system. The wireless communication system includes a plurality of radio communication devices in communication with a sender. In operation, the sender sends group data to the plurality of radio communication devices and further determines a call hang time sufficient to contain a dedicated acknowledgment slot for each of the plurality of radio communication devices. The sender reserves an acknowledgment slot in the determined call hang time for each radio communication device and further sends an acknowledgment polling signal to each radio communication device, where the acknowledgment polling signal identifies the respective acknowledgment slot that is reserved for each radio communication device to acknowledge receipt of the group data. The sender accordingly receives an acknowledgment from the radio communication devices during its respective reserved acknowledgment slot.

12 Claims, 5 Drawing Sheets

(56) References Cited

U.S. PATENT DOCUMENTS

| | | |
|---|---|---|
| 7,084,740 B2 | 8/2006 | Bridgelall |
| 7,263,379 B1 | 8/2007 | Parkulo et al. |
| 7,599,324 B2 | 10/2009 | Luebke et al. |
| 7,801,516 B2 | 9/2010 | Saito |
| 8,040,277 B2 | 10/2011 | Dicke |
| 2001/0051529 A1* | 12/2001 | Davies .......................... 455/519 |
| 2001/0055356 A1 | 12/2001 | Davies |
| 2002/0093928 A1 | 7/2002 | LoGalbo et al. |
| 2003/0227934 A1* | 12/2003 | White et al. ................... 370/432 |
| 2006/0067222 A1 | 3/2006 | Endoh |
| 2007/0076739 A1* | 4/2007 | Manjeshwar et al. ........ 370/432 |
| 2010/0080157 A1 | 4/2010 | Stewart |
| 2010/0254392 A1* | 10/2010 | Katar et al. ................... 370/400 |
| 2013/0324177 A1 | 12/2013 | Wiatrowski et al. |

OTHER PUBLICATIONS

Vertex Standard; Auto-Range Transpond System (ARTS) Fact Sheet; Dec. 2009, 2 Pages; vertexstandard.com.

International Search Report and Written Opinion for related counterpart International Patent Application No. PCT/US2013/040036, mailed on Nov. 20, 2013.

International Search Report and Written Opinion for counterpart International Patent Application No. PCT/US2013/040589, mailed on Nov. 18, 2013.

* cited by examiner

METHOD AND APPARATUS FOR CONFIRMING DELIVERY OF GROUP DATA TO RADIO COMMUNICATION DEVICES IN A WIRELESS COMMUNICATION SYSTEM

FIELD OF THE DISCLOSURE

The present disclosure relates generally to communication systems and more particularly to a method and apparatus for confirming delivery of group data to radio communication devices in wireless communication systems.

BACKGROUND

Wireless communication systems generally include a plurality of communication devices, such as mobile or portable radio devices that are located in multiple sites. Each site may include a set of base stations or repeaters for communicating information such as voice, data, control, and network management traffic between the communication devices and each other. The devices may be further logically divided into various subgroups, known as talkgroups, where each talkgroup can include a number of subscriber radio devices that participate in a group or dispatch call. Such communication systems also support group data messages, where a group data message sent by the subscriber radio device is received by other members of the group via communication links established between multiple end points, such as repeaters and dispatch consoles. Radio devices may use group data to deliver over the air information including firmware, parameters, keys, images, talkgroup management parameters, and the like.

Some wireless communication systems employing group data communication support only unconfirmed delivery of group data. Applications using group data, however, may need to know the success or failure of delivery. One existing method to provide such confirmation information is to build a solution at the application layer that allows applications to track the success or failure of a delivery of group data. However, providing confirmation mechanisms at the application layer reduces the effectiveness of group data. One method for providing confirmation is to have the receiving radio devices provide the confirmations by randomly delaying their acknowledgments of delivery, where the random delay is large enough to reduce the probability of collisions to an acceptable value. The main disadvantage of random delay is that it reduces the overall throughput of the group data. Further, the random delay may become worse if systems employ selective automatic repeat-request protocol (selective ARQ) for delivery and acknowledgment of group data, where selective ARQ is a specific instance of the ARQ protocol used for communications. Where long packets are used, the reliability of delivery can further decrease without the implementation of selective ARQ. For example, if the reliability of the delivery of a burst or block of data (12 bytes) is 99%, then for 32 bursts (384 bytes), the reliability reduces to 72%.

Accordingly, there is a need for an improved solution that provides group data delivery confirmation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
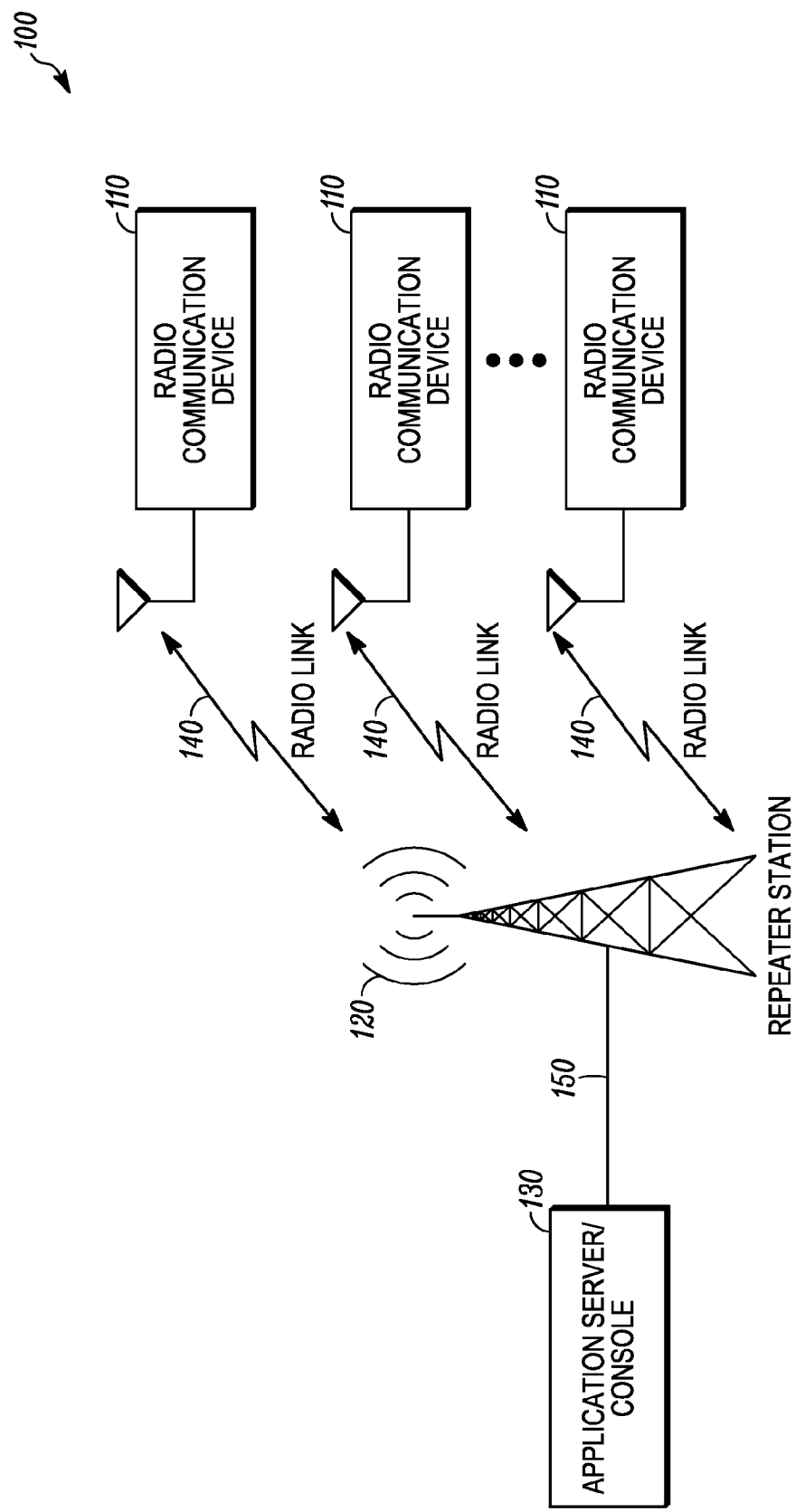
FIG. 1 is a block diagram of a wireless communication system in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

A method and apparatus for confirming delivery of group data to radio communication devices in a wireless communication system is provided herein. The wireless communication system includes a plurality of radio communication devices in communication with a sender station such as a repeater station, a control station, or a subscriber station. In operation, the sender station sends group data to the plurality of radio communication devices and further determines a call hang time sufficient to contain a dedicated acknowledgment slot for each of the plurality of radio communication devices. The sender station reserves an acknowledgment slot in the call hang time for each radio communication device and further sends an acknowledgment polling signal to each radio communication device. The acknowledgment polling signal identifies the respective acknowledgment slot that is reserved for each radio communication device to acknowledge receipt of the group data. The sender station accordingly receives an acknowledgment from the radio communication devices during its respective reserved acknowledgment slot.

FIG. 1 is a block diagram illustrating a wireless communication system 100 in accordance with an embodiment. The wireless communication system 100 comprises a plurality of radio communication devices 110 in communication with a repeater station 120. In one embodiment, the repeater station 120 may be replaced with any other suitable network infrastructure device that can receive information in a signal from a communication device and transmit information in signals to one or more communication devices via one or more wired or wireless communication links. Suitable network infrastructure devices include, but are not limited to, base stations, base transceiver stations, access points, routers, servers, or other types of infrastructure equipment interfacing a wireless communication device or subscriber unit in a wireless environment. The wireless communication system 100 further includes an application server/console 130 that is in communication with the repeater station 120. In accordance with some embodiments, the radio communication devices 110 are subscribers of a particular talk group and communicate with each other and application server/console 130 through the repeater station 120 via one or more traffic channels provided by radio links 140. In one embodiment, the radio communication devices 110 include devices that are commonly referred to as an access terminal, mobile radio, mobile station, wireless communication device, user equipment, mobile device, or any other device capable of operating in a wireless environment. Examples of radio communication devices 110 include, but are not limited to, two-way radios, mobile phones, cellular phones, personal digital assistants, laptops, and pagers. The radio links 140 comprise non-tangible communication resources, e.g., radio frequency (RF) resources, such as time division multiple access (TDMA) slots over which information is sent between the elements in the wireless communication system 100.

The application server/console 130 affiliates with subscribers/radio communication devices 110 of a particular talkgroup for monitoring purposes, that is, (i) to receive payload information such as audio, video, or data being communicated on the talk groups, (ii) to source payload for the talk groups, and/or (iii) to initiate formation of dynamic regrouping of radio communication devices 110. In one embodiment, the application server/console 130 monitors the success or failure of a delivery of group data to the plurality of radio communication devices 110 in the wireless communication system 100. In this embodiment, the repeater station 120 confirms delivery of group data to the radio communication devices 110 and prepares a report identifying the success or failure of the delivery of the group data and sends the report to the application server/console 130 via a communication link 150 for further processing. As used herein, the term "group data" refers to a same packet or a single data packet that is sent over the air (OTA) to multiple radio communication devices 110. Example of content of the group data includes, but is not limited to, firmware, parameters, keys, images, and talk group management parameters.

Further, it is to be understood that the wireless communication system 100 is only a logical representation of connections between a number of radio communication devices 110 and a repeater station 120, and thus the wireless communication system 100 may otherwise include multiple repeater stations 120, each repeater station 120 serving different logical groups of radio communication devices 110 that are distributed among multiple sites.

Figure 2:
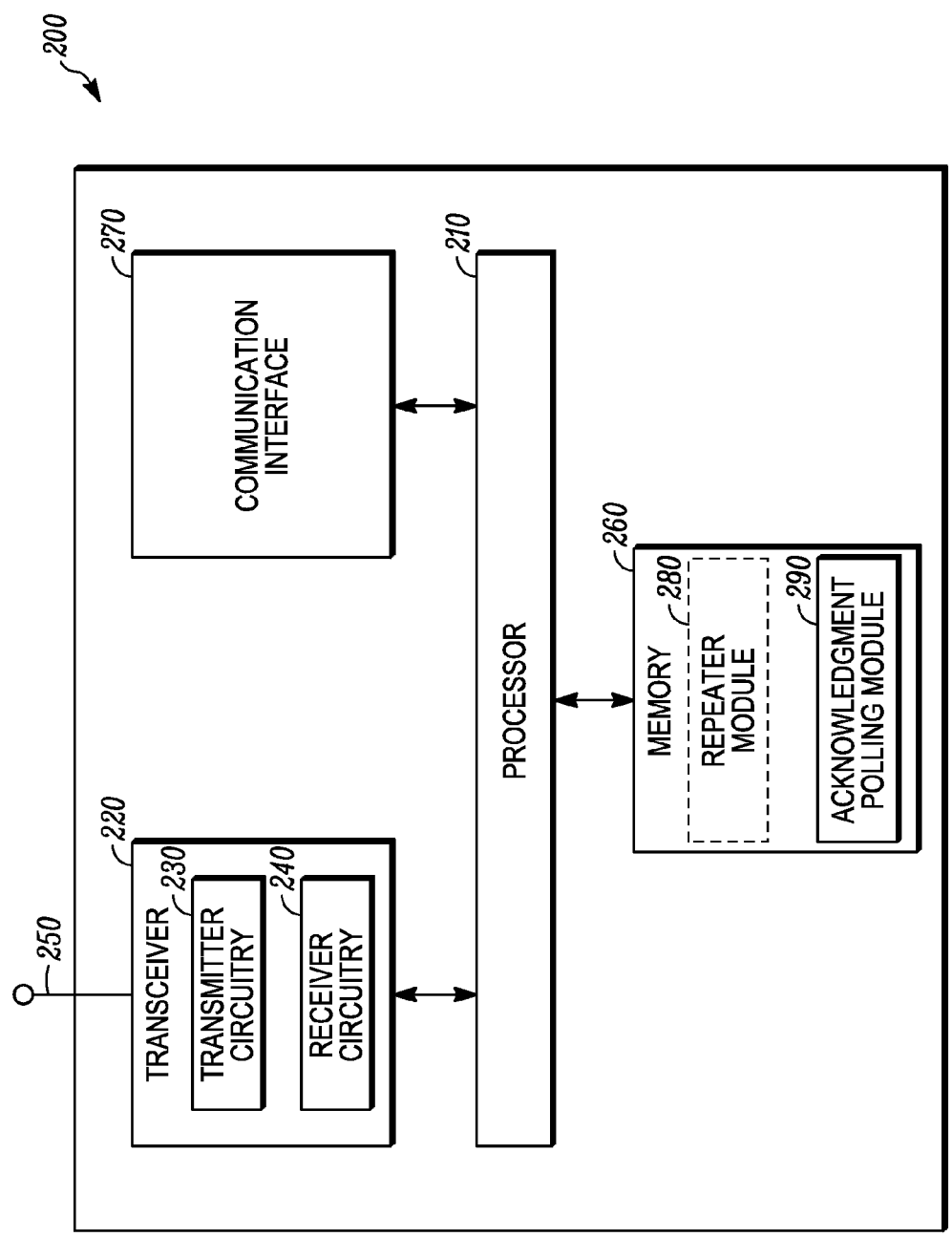
FIG. 2 is a block diagram of an apparatus that can be implemented, for example, in a repeater station in accordance with an embodiment of the present disclosure.

FIG. 2 is a block diagram of an apparatus 200 for operation within the wireless communication system 100 of FIG. 1 in accordance with some embodiments. The apparatus 200, for example, is implemented in a network infrastructure device or a subscriber or a control station for carrying out various functionalities that are necessary for performing the method of confirming delivery of group data to radio communication devices 110 in the wireless communication system 100. In one embodiment, the apparatus 200 is implemented in a repeater station 120 to carry out the functions of a repeater as well as the functions that are necessary for confirming delivery of group data. The apparatus 200 includes a processor 210, a transceiver 220 including a transmitter circuitry 230 and a receiver circuitry 240, an antenna 250, a memory 260 for storing operating instructions that are executed by the processor 210, and a communication interface 270. The apparatus 200 is an integrated unit containing at least all the elements depicted in FIG. 2, as well as any other elements necessary for the apparatus 200 to perform its particular function of confirming delivery of group data to radio communication devices 110. Alternatively, the apparatus 200 can comprise a collection of appropriately interconnected units or devices, wherein such units or devices perform functions that are equivalent to the functions performed by the elements of the apparatus 200.

The processor 210 includes one or more microprocessors, microcontrollers, DSPs (digital signal processors), state machines, logic circuitry, or any other device or devices that process information based on operational or programming instructions. Such operational or programming instructions (not shown) are stored in the memory 260. The memory 260 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 210 has one or more of its functions performed by a state machine or logic circuitry, the memory 260 containing the corresponding operational instructions can be embedded within the state machine or logic circuitry.

The transmitter circuitry 230 and the receiver circuitry 240 enable the apparatus 200 to communicate radio signals to, and acquire signals from, radio communication devices 110. In this regard, the transmitter circuitry 230 and the receiver circuitry 240 include appropriate conventional circuitry to enable digital or analog transmissions over a wireless communication channel. The transmitter circuitry 230 and the receiver circuitry 240 are implemented as part of the wireless device hardware and software architecture in accordance with known techniques. One of ordinary skill in the art will recognize that most, if not all, of the functions of the transmitter circuitry 230 and/or the receiver circuitry 240 can be implemented in a processor, such as the processor 210.

The receiver circuitry 240 is capable of receiving RF signals from at least one frequency band and optionally multiple frequency bands. The transmitter circuitry 230 and the receiver circuitry 240 may together form a wireless transceiver to enable bi-directional wireless communication with other devices. The antenna 250 comprises any known or developed structure for radiating and receiving electromagnetic energy in the frequency ranges over which the transmitter circuitry 230 and the receiver circuitry 240 use to communicate. The communication interface 270 includes appropriate hardware and software architecture in accordance with known techniques that enable communication with the radio communication devices 110 as well as the application server/console 130. In accordance with some embodiments, the communication interface 270 is implemented as a wireless interface for communication with the radio communication devices 110 and as a wired interface for communication with the application server/console 130.

As illustrated in FIG. 2, the memory 260 optionally comprises a repeater module 280 if the apparatus 200 is to be implemented in a repeater station 120. The repeater module 280 includes appropriate instructions that are executed by the processor 210 for performing the basic functions of a repeater. In one example, the repeater module 280 enables the repeater station 120 to receive group data from an application server/console 130 along with a list of target radio communication devices 110 to which the group data is destined to be sent. The repeater module 280 further enables the repeater station 120 to store the received group data in the memory 260 and forward the group data OTA to the target radio communication devices 110. The group data can include an identification of the talk group and also identification of the list of radio communication devices that are members of the talk group. Optionally, the repeater module 280 further stores talk group information in one or more configuration tables or databases, for use in talk group communications. The talk group information can include a group identifier and a device identifier for each radio communication 110 being served by the repeater station 120.

In accordance with embodiments of the present disclosure, the memory 260 further comprises an acknowledgment polling module 290 that includes appropriate instructions for execution by the processor 210 to carry out the method for confirming delivery of the group data to radio communication devices 110. The acknowledgment polling module 290 enables the repeater station 120 to determine a call hang time for a communication channel that is sufficient to contain a dedicated acknowledgment slot for each radio communication device 110 for which the group data has been previously sent over the air. In one embodiment, the acknowledgment polling module 290 determines call hang time based on the number of radio communication devices 110 that are subscribed to a particular talk group. In accordance with one embodiment, the radio communication devices 110 which are not members of the particular talk group refrain from initiating any transmission during the call hang time.

For example, if there are "N" radio communication devices 110 in a particular talk group, the call hang time for the communication channel is determined to be for a duration equal to at least "N" communication bursts so that each radio communication device 110 in the particular talk group gets an opportunity to use the communication channel and transmit a burst of data. As used herein, each communication burst represents a predefined time duration/period of the communication channel that is allocated to respective radio communication devices 110 during which the radio communication device 110 can seize the communication channel and further transmit bursts of data without any interruption from other radio communication devices. In accordance with embodiments of the present disclosure, the acknowledgment polling module 290 further reserves an acknowledgment slot in the determined call hang time for each radio communication device. In the above example, each acknowledgment slot can correspond to one communication burst of predefined time duration for a particular radio communication device 100. Accordingly, the acknowledgment polling signal identifies a time period or duration for each acknowledgment slot during which each radio communication device 110 is able to send an acknowledgment to the group data in their respective acknowledgment slots. In one embodiment, the acknowledgment polling module 290 can reserve multiple time slots within a call hang time, each time slot representing an acknowledgment slot that is reserved for a particular radio communication device 110. In embodiments of the present disclosure, the radio communication devices 110 refrain from initiating any communication outside of its respective acknowledgment slot during the call hang time.

After reserving the acknowledgment slots for each radio communication device, the acknowledgment polling module 290 further enables the repeater station 120 to generate a request for acknowledgment (e.g., an acknowledgment polling signal). In accordance with embodiments of the present disclosure, the acknowledgment polling signal is generated and transmitted according to the layer 2 (L2) signaling standards. For example, this signal may be generated according to the data link layer (L2) signaling procedures of the Open Systems Interconnection (OSI) model that is used to define communication protocols in many present systems. In one example, the acknowledgment polling signal identifies a sequence of identifiers (IDs) of the radio communication devices 110. For example, if there are three (3) radio communication devices 110 (e.g., "N"=3), the sequence is {R1, R2, R3}, where R1-R3 represent the respective identifiers of the radio communication devices 110. In this sequence, if a current communication burst, say $k^{th}$ burst, is used for sending the acknowledgment polling signal, a next communication burst, (e.g., $(k+1)^{th}$ burst immediately after the $k^{th}$ burst), is reserved for the first radio communication device (e.g., R1 specified in the sequence), and further communication bursts, (e.g., $(k+2)^{th}$ burst and $(k+3)^{th}$ burst) are reserved for second and third radio communication devices, respectively (e.g., R2 and R3, specified in the sequence). In accordance with some embodiments, the reservation of multiple acknowledgment slots, one for each radio communication device 110, and further transmitting in one acknowledgment polling signal, improves the probability of a radio communication device 110 receiving its reservation.

In one implementation of a communication system, such as a Digital Mobile Radio (DMR) system, the acknowledgment polling signal can be contained in a control signaling block (CSBK) packet data unit (PDU). In communication systems where a radio communication device cannot switch from a reception mode to a transmission mode immediately in a next burst, the acknowledgment polling module 290 may determine the call hang time for a duration equal to at least "N+2" communication bursts to allow the first radio communication device (e.g., R1 specified in the sequence) to switch from the reception mode to the transmission mode for sending acknowledgments. In this case, if a current communication burst, say $k^{th}$ burst, is used for sending the acknowledgment polling signal, the first radio communication device (e.g., R1 specified in the acknowledgment polling signal sequence {R1, R2, R3}) may use the time frame corresponding to the $(k+1)^{th}$ burst (e.g., communication burst immediately after $k^{th}$ burst) for switching from the reception mode to the transmission mode, and further the $(k+2)^{th}$ burst immediately after the $(k+1)^{th}$ burst is reserved as the acknowledgment slot for the first radio communication device. Accordingly, the $(k+3)^{th}$ burst and $(k+4)^{th}$ burst are reserved for the second and third radio communication devices, respectively, (e.g., R3 and R4 specified in the acknowledgment polling signal sequence).

On receipt of its ID in the acknowledgment polling signal, each radio communication device 110 uses its reserved acknowledgment slot in the communication channel to acknowledge receipt of the group data. In one embodiment, the radio communication device 110 returns an ACK (Positive Acknowledgment), NACK (Negative acknowledgment), or SARQ (Selective Automatic Repeat Request) responses using its reserved acknowledgment slot. The radio communication device 110 returns an ACK response in its reserved acknowledgment slot when it successfully receives the entire group data. The radio communication device 110 returns a NACK response in its reserved acknowledgment slot when it fails to receive the group data. The radio communication device 110 returns a SARQ response when it does not receive the entire burst of group data (e.g., when it receives only portions or certain bursts of the group data). In accordance with embodiments of the disclosure, the acknowledgment polling module 290 takes the following actions after receiving the responses from the radio communication devices 110:

(i) If one or more NACK responses are received, then the acknowledgment polling module 290 enables retransmission of the entire group data.
  (ii) If no NACK response is received, but one or more SARQ responses is received, then the acknowledgment polling module 290 enables retransmission of the union of all the missed bursts as notified by one or more radio communication devices 110 in their SARQ response.

(iii) After transmitting the whole packet or the missed bursts, the acknowledgment polling module 290 determines another call hang time for duration equal to at least M bursts, where M is the total number of NACK or SARQ responses received. In this case, the acknowledgment polling module 290 polls only the radio communication devices 110 that either sent the NACK or SARQ responses. In systems, where the radio communication device 110 is not able to immediately switch to a transmission mode in a next burst, the call hang time is set to be for a duration equal to at least M+2 bursts.

(iv) If no NACK or SARQ response is received, the acknowledgment polling module 290 stops the process of confirming delivery of group data. If required, the acknowledgment polling module 290 repeats the above steps for a configurable number of times and informs the result of delivery to the application server/console 130 and/or a sender of the group data.

(v) In systems where the radio communication device 110 is not able to immediately switch to a transmission mode in a next burst, the above actions (i) through (iv) take place at least after N+2 bursts, where "N" represents the number of radio communication devices 110.

Figure 3:
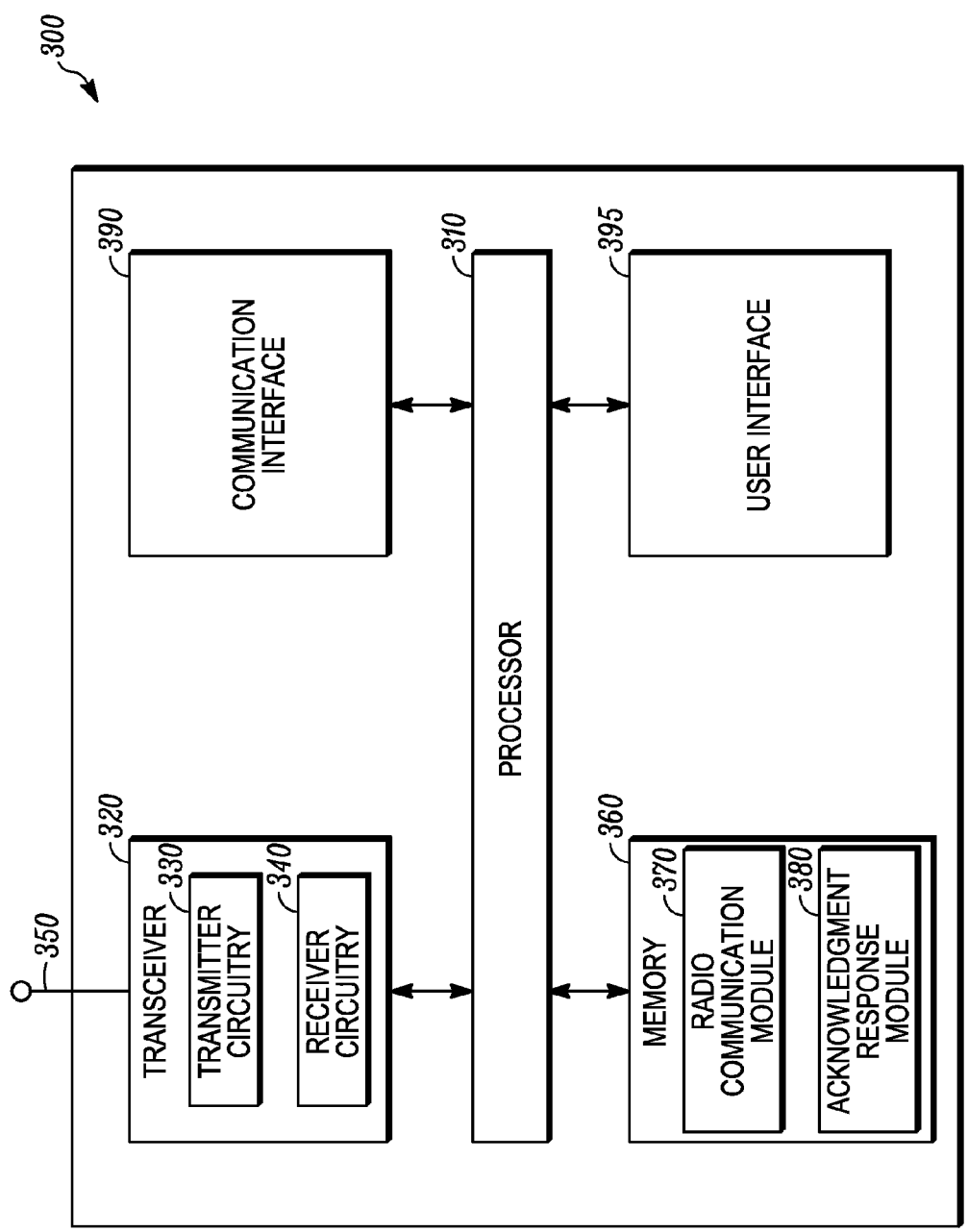
FIG. 3 is a block diagram of an apparatus that can be implemented, for example, in a radio communication device in accordance with an embodiment of the present disclosure.

FIG. 3 is a block diagram of an apparatus 300 for operation within the wireless communication system 100 of FIG. 1 in accordance with some embodiments. The apparatus 300, for example, is implemented in subscriber devices for carrying out various functionalities that are necessary for receiving group data from the apparatus 200 implemented in a transmitting station, for example repeater station 120, and further confirming delivery of group data. In one embodiment, the apparatus 300 is implemented in a radio communication device 110 to enable the radio communication device 110 to receive group data from the repeater station 120 and further send an acknowledgment to the repeater station 120 during its subsequent acknowledgment slot reserved by the repeater station 120. The apparatus 300 includes a processor 310, a transceiver 320 including a transmitter circuitry 330 and a receiver circuitry 340, an antenna 350, a memory 360 for storing operating instructions including a radio communication module 370 and an acknowledgment response module 380 that are executed by the processor 310, a communication interface 390, and a user interface 395.

The processor 310 includes one or more microprocessors, microcontrollers, DSPs, state machines, logic circuitry, or any other device or devices that process information based on operational or programming instructions. Such operational or programming instructions (not shown) are stored in the memory 360. The memory 360 can be an IC memory chip containing any form of RAM, a floppy disk, a CD-RW, a hard disk drive, a DVD-RW, a flash memory card, external SIM card or any other medium for storing digital information. One of ordinary skill in the art will recognize that when the processor 310 has one or more of its functions performed by a state machine or logic circuitry, the memory 360 containing the corresponding operational instructions can be embedded within the state machine or logic circuitry.

The transmitter circuitry 330 and the receiver circuitry 340 enable the apparatus 300 to communicate radio signals to, and acquire signals from, the apparatus 200. In this regard, the transmitter circuitry 330 and the receiver circuitry 340 include appropriate conventional circuitry to enable digital or analog transmissions over a wireless communication channel. The transmitter circuitry 330 and the receiver circuitry 340 are implemented as part of the wireless device hardware and software architecture in accordance with known techniques. One of ordinary skill in the art will recognize that most, if not all, of the functions of the transmitter circuitry 330 and/or the receiver circuitry 340 can be implemented in a processor, such as the processor 310.

The receiver circuitry 340 is capable of receiving RF signals from at least one frequency band and optionally multiple frequency bands. The antenna 350 comprises any known or developed structure for radiating and receiving electromagnetic energy in the frequency range containing the wireless carrier frequencies. The communication interface 390 includes appropriate hardware and software architecture in accordance with known techniques that enable communication with the apparatus 200. In accordance with some embodiments, the communication interface 390 is implemented as a wireless interface for communication with repeater station 120.

The user interface 395 can include both input and output components. The user interface 395 may include an audio input component such as a microphone, and mechanical input components such as buttons or key selection sensors, touch pad sensors, touch screen sensors, capacitive sensors, motion sensors, and switches. Likewise, the output component of the user interface 395 may include a variety of video display, audio, and/or mechanical outputs. Other examples of output components include an audio output component such as a speaker, alarm and/or buzzer, and/or a mechanical output component such as vibrating or motion-based mechanisms.

As illustrated in FIG. 3, the memory 360 further comprises a radio communication module 370 that includes appropriate instructions that are executed by the processor 310 for performing the basic functions of a radio communication device 110 including enabling the transceiver 320 to receive group data from the apparatus 200 that is implemented, for example, in either a repeater station 120 or a subscriber or control station. The memory 360 further comprises an acknowledgment response module 380 that identifies an acknowledgment slot that is reserved for the radio communication device 110 based on the acknowledgment polling signal received from the apparatus 200. The acknowledgment response module 380 includes appropriate instructions to enable the radio communication device 110 to send an acknowledgment during the corresponding reserved acknowledgment slot. As described above, the acknowledgment slot was previously reserved by the acknowledgment polling module 290 of the apparatus 200 based on determining a call hang time that is sufficient to contain a acknowledgment slot for each of the radio communication devices 110 that are members of a particular talk group. The acknowledgment response module 380 enables the radio communication device 110 to respond with an ACK, NACK, or SARQ response (among other possibilities) using its reserved acknowledgment slot. The acknowledgment response module 380 may generate an ACK response when the radio communication module 370 determines that it has successfully received the entire group data. The acknowledgment response module 380 may generate an NACK response when the radio communication module 370 determines that it has failed to receive the group data. The acknowledgment response module 380 may generate a SARQ response when the radio communication module 370 determines that it has not received the entire burst of group data or when the radio communication module 370 determines that it has received only portions or certain bursts of the group data.

Figure 4:
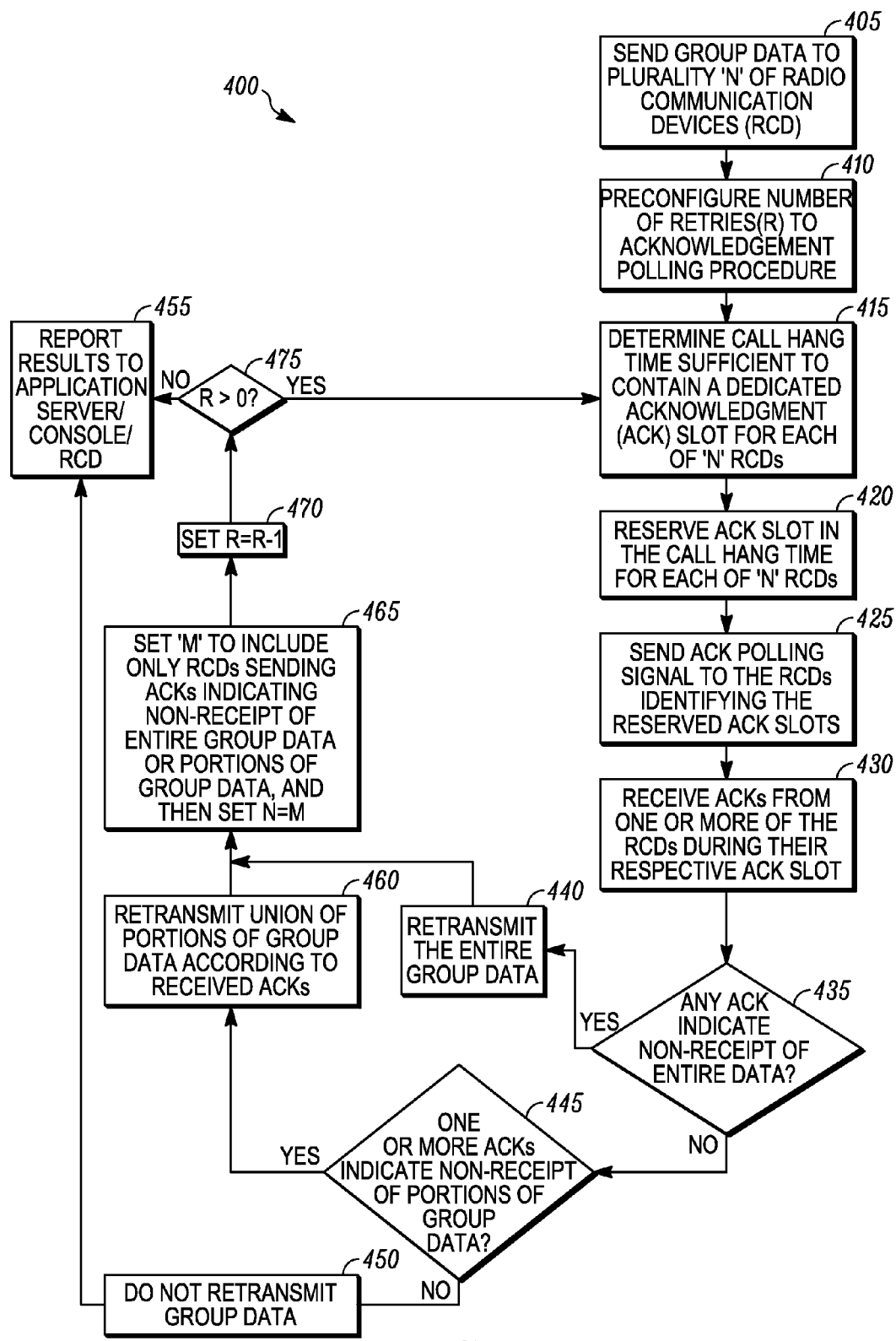
FIG. 4 is a flowchart illustrating a method of operation by an apparatus of FIG. 2 for confirming delivery of group data to a plurality of radio communication devices in accordance with an embodiment of the present disclosure.

FIG. 4 is a flowchart illustrating a method 400 of operation by an apparatus 200 that is implemented, for example, in a repeater station 120 or a control station, or in a subscriber station such as a radio communication device 110 for confirming delivery of group data to a plurality of radio communication devices 110 in a wireless communication system 100 in accordance with an embodiment of the present disclosure. At block 405, the apparatus 200 sends group data, e.g., a single data packet to a plurality of radio communication devices 110, for example "N" number of radio communication devices (RCDs). In one embodiment, the apparatus 200 receives the group data from an application server/console 130 or from a subscriber station along with the group identifier for a talk group and device identifiers identifying the list of radio communication devices 110 that are members of the talk group. At block 410, the apparatus 200 preconfigures a number of retries (R) to the acknowledgment polling procedure. The apparatus 200 sets 'R' such that the acknowledgment polling procedure (blocks 415 through 475) associated with the method 400 is repeated for a configurable number of times. Next, at block 415, the apparatus 200 determines a call hang time that is sufficient to contain a dedicated acknowledgment slot for each of the "N" radio communication devices 110. In one embodiment, the apparatus 200 determines the number of radio communication devices 110 in the talk group and sets call hang time proportional to the number of radio communication devices 110. In accordance with embodiments of the present disclosure, the call hang time is large enough for all the radio communication devices 110 in the talk group to respond to the group data, and further, the call hang time allows polling of the radio communication devices 110 in a scheduled access manner for their respective responses.

At block 420, the apparatus 200 reserves an ACK slot within the call hang time for each of the "N" radio communication devices 110 in the talk group. In one embodiment, each acknowledgment slot can correspond to one communication burst of predefined time duration or one time slot for each radio communication device 110. Next, at block 425, the apparatus 200 generates an acknowledgment polling signal to include information about the reserved acknowledgment slots and further sends the acknowledgment polling signal over the air to the radio communication devices 110. In one embodiment, the acknowledgment polling signal includes a sequence of device identifiers of the radio communication devices 110 and reserved size of the responses for each device identifiers included in the sequence. In accordance with some embodiments, the reservation of multiple acknowledgment slots, one for each radio communication device, and further transmitting in one acknowledgment polling signal, improves the probability of a radio communication device receiving its reservation. As described previously, in DMR systems, the acknowledgment polling signal can be contained in CSBK PDUs. In communication systems where a radio communication device 110 requires a certain time period, say ninety (90) milliseconds, to switch from the reception mode to transmission mode, the apparatus 200 sets a call hang time for a duration equal to at least "N+2" communication bursts to allow a first radio communication device R1 specified in the acknowledgment polling signal sequence to switch from the reception mode to the transmission mode for sending the acknowledgment response.

In response to the acknowledgment polling signal sent by the apparatus 200, one or more radio communication devices 110 may send an acknowledgment response during their respective acknowledgment slots. At block 430, the apparatus 200 receives such acknowledgment responses from one or more radio communication devices 110 during their respective communication slots. As described previously, such acknowledgment response can include ACK, NACK, or SARQ responses. Next at block 435, the apparatus 200 determines whether any acknowledgment responses received from at least one of the radio communication devices 110 identifies a non-receipt of the entire group data. In one embodiment, the radio communication devices 110 may include a "NACK" indicator in their acknowledgment responses to indicate that the entire group data is not successfully delivered. The apparatus 200 proceeds to retransmit the entire group data over the air as shown in block 440 when it determines that there is at least one acknowledgment response that indicates the non-receipt of entire group data. Otherwise, the apparatus 200 proceeds to block 445 to further determine whether there is an acknowledgment response that indicates non-receipt of portions of group data when there is no acknowledgment response that indicates non-receipt of the entire group data. If there is no acknowledgment response that indicates non-receipt of portions of group data or entire group data e.g., if all of the acknowledgment response(s) include an "ACK" indicator, then the apparatus 200 assumes that the group data is successfully delivered to all the radio communication devices 100 and therefore does not perform retransmission of the group data as shown in block 450. Next, at block 455, the repeater station 120 reports the results of the delivery of the group data to the application server/console 130 and/or a subscriber station that initiated sending of the group data. In this case, the apparatus 200 may indicate in the report a confirmation of successful delivery of group data to all the members in the talk group.

Returning to block 445, when the apparatus 200 determines that there are one or more acknowledgment responses that indicate a non-receipt of at least a portion of group data, the apparatus 200 proceeds to block 460 to perform retransmission of the portion of the group data over the air. In one embodiment, the radio communication devices 110 uses a "SARQ" indicator along with an identifier of the missing portions of the group data in their acknowledgment responses to indicate that one or more portions of the group data was not successfully received. In one example, the retransmitted portions of group data may include a union of portions of group data that have not been successfully delivered to one or more radio communication devices 110 that indicated missing portions of group data in their acknowledgment responses. In an embodiment, if the apparatus 200 determines that the union of all missing portions of group data is equivalent to the entire group data, then the apparatus 200 performs retransmission of entire group data. For example, assume there are five (5) portions in a group data and there are three (3) radio communication devices that are being polled for confirming delivery of group data. Further, assume that a first radio communication device has sent an acknowledgment response indicating non-receipt of a first portion and a third portion; a second radio communication device has sent an acknowledgment response indicating non-receipt of a second portion and fourth portion; and a third radio communication device has sent an acknowledgment response indicating non-receipt of a fifth portion. In this case, the apparatus 200 sends the entire group data since the union of five missing portions from the three radio communication devices is equivalent to the entire group data.

After retransmitting all or portions of the group data, the apparatus 200 determines a subset of radio communication devices from among the plurality of radio communication devices 110 that (i) sent an acknowledgment response identifying the non-receipt of entire group data or (ii) sent an acknowledgment response identifying the non-receipt of at least a portion of group data. In one embodiment, as shown in block 465, the apparatus 200 sets "M" to include only the radio communication devices 110 identified in the subset. In other words, the apparatus 200 does not poll or reserve acknowledgment slots for radio communication devices 110 that sent a positive acknowledgment or radio communication devices 110 that failed to send an acknowledgment response in their respective acknowledgment slots. The apparatus 200 then sets "N"="M" for further use in step 415. In an alternative embodiment, the apparatus 200 also polls or reserves acknowledgment slots for radio communication devices that failed to send an acknowledgment in response to the acknowledgment polling signal. At block 470, the apparatus 200 sets R=R−1 (e.g., R is decremented by 1 to indicate completion of the current retry to the acknowledgment polling procedure). Next, at block 475, the apparatus 200 determines whether the acknowledgment polling procedure has been repeated for the pre-configured number of times R (e.g., R>0). If R equals zero (0), then the apparatus 200 prepares and sends a report based on the results received during the number of retries R to the acknowledgment polling procedure as shown in block 455. Otherwise, if R is greater than zero (0), then the apparatus 200 proceeds to poll only those radio communication devices 110 in the subset to confirm if the retransmitted group data or a portion of group data is successfully delivered. In this case, the apparatus 200 determines another call hang time that is sufficient to contain a dedicated acknowledgment slot for each radio communication device 110 in the subset that either sent a NACK or SARQ response. The apparatus 200 further reserves an acknowledgment slot in the determined call hang time for each radio communication device 110 in the subset and generates a second acknowledgment polling signal along with the information related to the reserved acknowledgment for sending over the air to the radio communication devices 110. The apparatus 200 may receive acknowledgment responses from one or more radio communication devices 110 in the subset and repeats the above polling procedure for the pre-configured number R of times or until there is no radio communication device 100 in the subset that is to be polled. In case there are no radio communication devices 110 in the subset (e.g., if "N"=0), then the apparatus 200 assumes that the group data has been successfully delivered to all the radio communication devices 110 in the talk group and accordingly prepares and sends a report confirming the delivery of group data to all the members in the talk group as shown in block 455.

Although, the method 400 is described as being performed in the context of group data, the method 400 is also applicable for confirming delivery of unicast data between communication devices in the wireless communication system 100.

Figure 5:
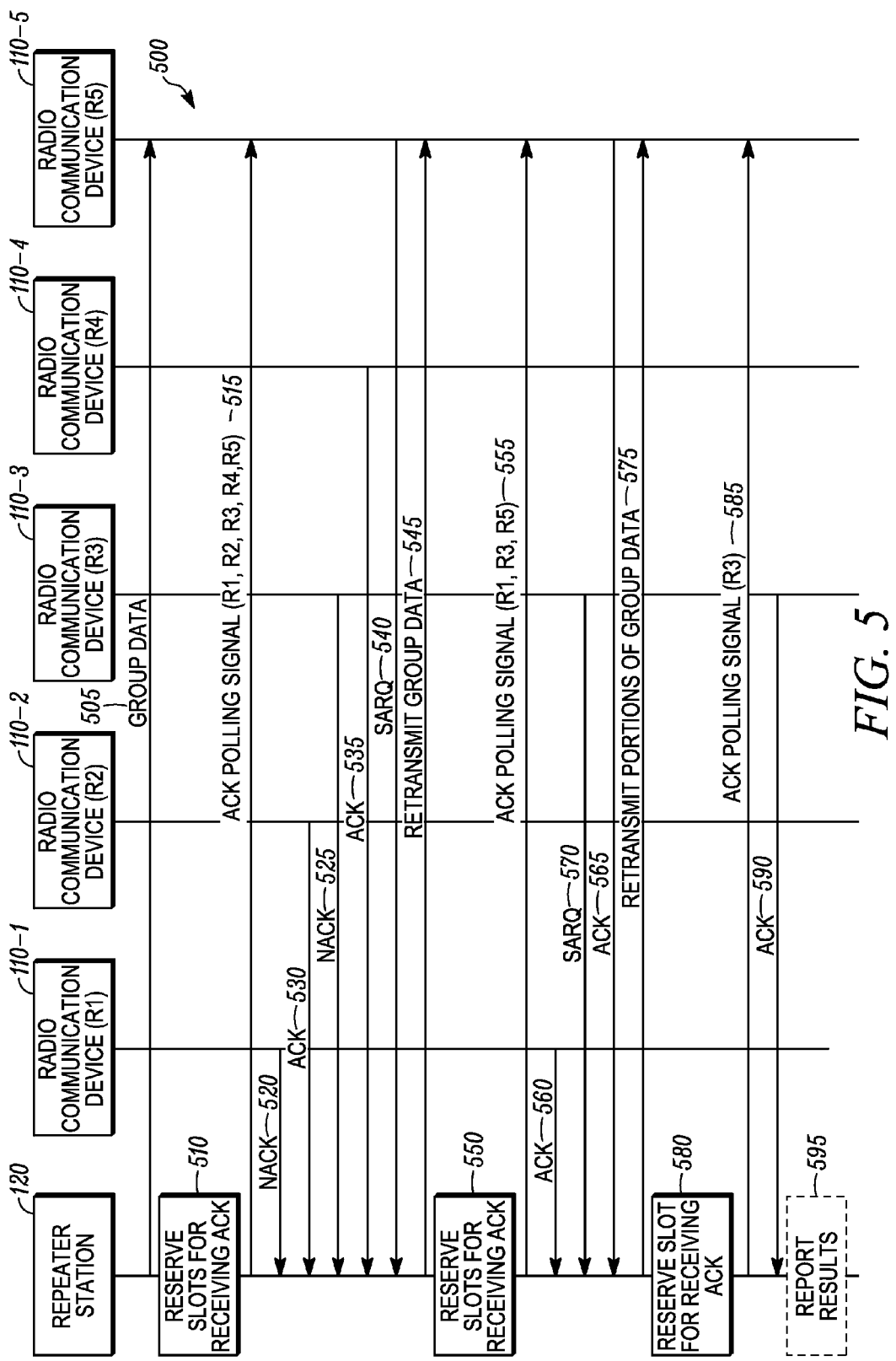
FIG. 5 is a message sequence chart illustrating an operation of the wireless communication system in accordance with some embodiments.

FIG. 5 is a message sequence chart 500 illustrating the operation of the wireless communication system 100 in accordance with one embodiment. Assume that the wireless communication system 100 comprises a repeater station 120 in communication with five (5) radio communication devices 110-1 through 110-5 that are members of a particular talk group. In operation, the repeater station 120 sends group data 505 over the air to the radio communication devices 110-1 through 110-5. The repeater station 120 further reserves 510 acknowledgment slots for each radio communication device 110-1 through 110-5 by setting a call hang time that is sufficient to contain a dedicated acknowledgment slot for the five radio communication devices 110-1 through 110-5. The acknowledgment polling signal 515 is sent along with information about the reserved acknowledgment slots. The acknowledgment polling signal 515 also identifies the sequence {R1, R2, R3, R4, R5} in which each of the five radio communication devices 110-1 through 110-5 can send an acknowledgment to the group data during their respective acknowledgment slots. In the example shown in FIG. 5, the radio communication devices 110-1 and 110-3 respond with acknowledgment responses 520, 525 including NACK indicators in their respective acknowledgment slots to identify that the group data is not successfully delivered at the radio communication devices 110-1 and 110-3. The radio communication devices 110-2 and 110-4 respond with acknowledgment responses 530, 535 including ACK indicators in their respective acknowledgment slots to identify that the group data is successfully delivered at the radio communication devices 110-2 and 110-4. The radio communication device 110-5 responds with an acknowledgment response 540 including a SARQ indicator in its acknowledgment slot to identify missing bursts or portions of group data that were not successfully delivered. The repeater station 120 receives the acknowledgment responses 520, 525, 530, 535, 540 including the NACK, ACK, and SARQ indicators.

In accordance with embodiments of the present disclosure, the repeater station 120 retransmits the entire group data 545 over the air to the radio communication devices 110-1 through 110-5 and further reserves 550 acknowledgment slots for the radio communication devices 110-1 and 110-3 that sent acknowledgment responses 520, 525 with NACK indicator and for radio communication device 110-5 that sent an acknowledgment response 540 with SARQ indicator. The repeater station 120 further sends an acknowledgment polling signal 555 over the air identifying the sequence {R1, R3, R5} in which the radio communication devices 110-1, 110-3, and 110-5 can send the acknowledgment response to the retransmitted group data in their respective acknowledgment slots. In the example shown in FIG. 5, the radio communication devices 110-1 and 110-5 send acknowledgment responses 560, 565 including an ACK indicator in their respective acknowledgment responses to identify that the group data was successfully delivered while the radio communication device 110-3 sends an acknowledgment response 570 including a SARQ indicator in its acknowledgment slot to identify the missing bursts or portions of group data that was not successfully delivered.

In accordance with embodiments of the present disclosure, the repeater station 120 retransmits missing bursts or portions of group data 575 that have been indicated in the acknowledgment response 570 as not being successfully delivered. The repeater station 120 again reserves 580 an acknowledgment slot to poll the radio communication device 110-3 to check if the retransmitted missing burst or portions of group data is successfully delivered and accordingly sends an acknowledgment polling signal 585 including information about the acknowledgment slot and the sequence {R3} in which the radio communication device 110-3 can send the acknowledgment response. In reply to the acknowledgment polling signal 585, the radio communication device 110-3 sends an acknowledgment response 590 with an ACK indicator to identify that it has successfully received the group data. The repeater station 120 at this point confirms that the group data is successfully delivered at each of the radio communication devices 110-1 through 110-5 and reports 595 the results to the application server/console 130 to confirm the successful delivery of group data at all the radio communication devices 110-1 through 110-5.

In the embodiment shown in FIG. 5, the acknowledgment polling signals 515, 555, 585 are broadcasted OTA to all radio communication devices 110-1 through 110-5. Only those radio communication devices from which an acknowledgment response is required are identified in the broadcasted acknowledgment polling signals 515, 555, 585. In an alternative embodiment, the acknowledgment polling signals 515, 555, 585 may be either selectively multicasted or unicasted for transmission to only those radio communication devices from which an acknowledgment response is required. Other possibilities exist as well.

Example Applications

Embodiments of the present disclosure discussed herein may be applied to enhance the conventional dynamic regrouping process used in wireless communication systems. Dynamic regrouping process is typically used to form a customized group of radio communication devices 110 in cases of special events. Such dynamic regrouping of radio communication devices 110 must occur rapidly and predictably. In conventional dynamic regrouping process, the instruction for dynamic reprogramming is sent individually to the radio communication devices 110. However, a shortcoming of individually sending the instruction to the radio communication devices 110 is that it forces the radio communication devices 110 to form immature groups of relatively long duration. A way to overcome this shortcoming is to send the instruction for dynamic reprogramming as a group message. Since the group message is received by all the radio communication devices 110 at the same time, the duration of the immature group is negligible. However, when group messages are used in a conventional manner to dynamically regroup the radio communication devices 110, the effect of regrouping is unknown to the sender of the group messages.

In accordance with embodiments of the present disclosure, the above shortcoming of the group message for the use of dynamic regrouping of radio communication devices 110 can be overcome by having the repeater station 120 or a sender of the group message confirm the delivery of the group message and provide the results of the dynamic regrouping instruction. The embodiments of the present disclosure allow the dynamic regrouping of radio communication devices both fast and predictable.

In one implementation of the dynamic regrouping of radio communication devices 110 using the embodiments of the present disclosure, a console 130 sends the instruction along with the identifier of the dynamic group, a list of member radio communication devices 110, and other attributes for the dynamic group to the repeater station 120, for example using a user datagram protocol/internet protocol (UDP/IP) over a local area network/wide area network. The repeater station 120 receives this instruction and then transmits the instruction over the air with the destination field set to "all radio communication devices." After transmitting, the repeater station 120 determines call hang time as described above and reserves acknowledgment slots to allow each of these radio communication devices 110 to respond to the instruction. Depending on the responses received during the call hang time from the radio communication devices 110, the repeater station 120 informs the results of the dynamic regrouping to the console 130. In one example, the repeater station 120 can transmit the results of the dynamic regrouping along with the identifier of the dynamic group, perhaps including a list of member radio communication devices that either failed to respond to the instruction or responded to the instruction with either a NACK or SARQ response. If required, the repeater station 120 can poll the radio communication devices 110 a configurable number of times and inform the results of delivery to the console. The instruction of dynamic regrouping may also include actions other than creation of a new group such as attaching the new group to a personality, inserting the group into the address book, and the like. The instruction may also contain the life duration of the group or the delay after which the group will become an active group. In a good radio frequency condition, the simulation results implementing the embodiments of the present disclosure demonstrate a minimum of twenty-five (25) radio communication devices that can be dynamically grouped in approximately 1.8 seconds.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for confirming delivery of group data to a plurality of radio communication devices in a wireless communication system, the method comprising:
    sending group data to the plurality of radio communication devices;
    determining a call hang time sufficient to contain a dedicated acknowledgment slot for each of the plurality of radio communication devices;
    reserving an acknowledgment slot in the determined call hang time for each radio communication device in the plurality;
    sending an acknowledgment polling signal to each of the plurality of radio communication devices, the acknowledgment polling signal identifying the respective acknowledgment slot that is reserved for each radio communication device to acknowledge receipt of the group data; and
    receiving an acknowledgment from at least one of the plurality of radio communication devices during its respective reserved acknowledgment slot; and
    determining whether the acknowledgment received from the at least one of the plurality of radio communication devices identifies a non-receipt of only a portion of the group data;
    determining a subset of radio communication devices from among the plurality of radio communication devices that sent an acknowledgment identifying the non-receipt of only a portion of the group data; and
    determining at least one other call hang time sufficient to contain a dedicated acknowledgment slot for each of the radio communication devices in the subset;
    reserving an acknowledgment slot in the at least one other call hang time for each radio communication device in the subset;
    sending another acknowledgment polling signal to the radio communication devices in the subset, the another acknowledgment polling signal identifying the respective acknowledgment slot that is reserved for each radio communication device in the subset to acknowledge receipt of the group data; and
    receiving an acknowledgment from at least one of the radio communication devices in the subset during its respective reserved acknowledgment slot.

2. The method of claim 1, wherein the acknowledgment polling signal further identifies a sequence in which each radio communication device sends an acknowledgment to the group data during their respective acknowledgment slot.

3. The method of claim 1, wherein the acknowledgment polling signal further identifies a time period for each acknowledgment slot during which each radio communication device is able to send an acknowledgment to the group data in their respective acknowledgment slot.

4. The method of claim 1, wherein the plurality of radio communication devices are members of a same talk group and further wherein the group data includes an identification (ID) of the talk group and IDs of the members of the talk group.

5. The method of claim 1, further comprising refraining, by each of the plurality of radio communication devices, from initiating any communication outside of its respective acknowledgment slot during the call hang time.

6. An apparatus for confirming delivery of group data to a plurality of radio communication devices in a wireless communication system, the apparatus comprising:
    a wireless transceiver; and
    a processor coupled to the wireless transceiver and configured to:
        determine a call hang time sufficient to contain a dedicated acknowledgment slot for each of the plurality of radio communication devices,
        reserve an acknowledgment slot in the determined call hang time for each radio communication device,
        cause the wireless transceiver to transmit group data to the plurality of radio communication devices,
        cause the wireless transceiver to transmit an acknowledgment polling signal to each of the plurality of radio communication devices, the acknowledgment polling signal identifying the respective acknowledgment slot that is reserved for each radio communication device to acknowledge receipt of the group data; and
        receive, via the wireless transceiver, an acknowledgment from at least one of the plurality of radio communication devices during its respective reserved acknowledgment slot;
    wherein the processor is configured to:
    determine whether the acknowledgment received from the at least one of the plurality of radio communication devices identifies a non-receipt of only a portion of the group data;
    determine a subset of radio communication devices from among the plurality of radio communication devices that sent an acknowledgment identifying the non-receipt of only a portion of the group data;
    determine at least one other call hang time sufficient to contain a dedicated acknowledgment slot for each of the radio communication devices in the subset;
    reserve an acknowledgment slot in the at least one other call hang time for each radio communication device in the subset;
    send another acknowledgment polling signal to the radio communication devices in the subset, the another acknowledgment polling signal identifying the respective acknowledgment slot that is reserved for each radio communication device in the subset to acknowledge receipt of the group data; and receiving an acknowledgment from at least one of the radio communication devices in the subset during its reserved communication slot.

7. The apparatus of claim 6, wherein the processor is configured to cause the wireless transceiver to retransmit the group data to the plurality of radio communication devices when the processor determines that at least one of the plurality of radio communication devices has not sent an acknowledgment to the group data.

8. The apparatus of claim 6, wherein the processor is configured to cause the wireless transceiver to request the plurality of radio communication devices to refrain from initiating any transmission outside of their respective communication slots during the call hang time.

9. The apparatus of claim 6, wherein the processor is configured to generate the acknowledgment polling signal according to link layer (L2) signaling.

10. The apparatus of claim 6, wherein the processor is configured to process the acknowledgment received from the at least one of the plurality of radio communication devices and prepare a report based on whether the at least one of the plurality of radio communication devices received the entire group data or only a portion of the group data.

11. The apparatus of claim 10, wherein the processor is configured to send the report to an application server or a console.

12. A subscriber device in a wireless communication system, the subscriber device comprising:
a radio communication module for:
receiving group data from a repeater station, wherein the group data is sent by the repeater station to a plurality of subscriber devices; and
receiving an acknowledgment polling signal from the repeater station, wherein the acknowledgement polling signal is sent by the repeater station to the plurality of subscriber devices, the acknowledgment polling signal indicating the respective acknowledgment slot that is reserved for each of the plurality of subscriber devices to acknowledge receipt of the group data;
sending an acknowledgment to the repeater station during the reserved acknowledgment slot; and
an acknowledgment response module for:
identifying an acknowledgement slot based on the acknowledgement polling signal received from the repeater station, the acknowledgement slot being reserved for the subscriber device to acknowledge receipt of the group data during a call hang time set by the repeater station that is sufficient to contain a dedicated acknowledgment slot for each of the plurality of subscriber devices.

* * * * *

UNITED STATES PATENT AND TRADEMARK OFFICE
CERTIFICATE OF CORRECTION

PATENT NO. : 9,042,356 B2
APPLICATION NO. : 13/485125
DATED : May 26, 2015
INVENTOR(S) : Dipendra M. Chowdhary et al.

Page 1 of 1

It is certified that error appears in the above-identified patent and that said Letters Patent is hereby corrected as shown below:

IN THE TITLE PAGE:

On Page 2, in Item (56), under "OTHER PUBLICATIONS," in Column 2, Line 1, delete "Transpond" and insert -- Transponder --, therefor.

IN THE SPECIFICATION:

In Column 5, Line 43, delete "device 10 0 ." and insert -- device 110. --, therefor.

In Column 8, Line 47, delete "a acknowledgment" and insert -- an acknowledgment --, therefor.

In Column 10, Lines 19-20, delete "devices 10 0" and insert -- devices 110 --, therefor.

In Column 11, Line 36, delete "device 10 0" and insert -- device 110 --, therefor.

Signed and Sealed this
Fifth Day of July, 2016

Michelle K. Lee
*Director of the United States Patent and Trademark Office*